March 24, 1964     J. KATONA     3,125,932
MACHINE FOR THE MANUFACTURE OF METAL CUTTING TOOLS
Filed Sept. 27, 1961     5 Sheets-Sheet 3

INVENTOR.
JENO KATONA
BY Blum, Moscovitz,
Friedman and Blum
Attorneys

March 24, 1964 J. KATONA 3,125,932
MACHINE FOR THE MANUFACTURE OF METAL CUTTING TOOLS
Filed Sept. 27, 1961 5 Sheets-Sheet 4

INVENTOR.
JENŐ KATONA
BY Blum, Moscovitz,
Friedman & Blum
Attorneys

March 24, 1964     J. KATONA     3,125,932
MACHINE FOR THE MANUFACTURE OF METAL CUTTING TOOLS
Filed Sept. 27, 1961     5 Sheets-Sheet 5

INVENTOR.
JENŐ KATONA
BY Blum, Moscovitz,
Friedman and Blum
Attorneys

United States Patent Office 3,125,932
Patented Mar. 24, 1964

3,125,932
MACHINE FOR THE MANUFACTURE OF
METAL CUTTING TOOLS
Jenő Katona, Budapest, Hungary, assignor to Csepel
Vas-es Femmuvek, Csepel, Hungary, a firm
Filed Sept. 27, 1961, Ser. No. 141,574
Claims priority, application Hungary Sept. 30, 1960
6 Claims. (Cl. 90—15)

The invention relates to apparatus for the machining of work-pieces, such as metal cutting tools, for example, either by individual fabrication or by automatic operation performed on a machine equipped with automatic work feed, at a high rate of production and level of quality.

The methods hitherto used for the machining of work-pieces, and in particular metal cutting, have certain disadvantages. The work-pieces are generally machined by jobbing methods and there may be several surfaces and cutting edges to be machined on every workpiece. No matter how many work-pieces have to be manufactured, one of the plane surfaces is machined first, according to the usual method, on each of the work-pieces on one of the available machines, then follows machining of the second plane on the same or another machine, and so on. As a consequence of this manufacturing process, each work-piece has to be separately set up and then removed for machining each surface.

In view of the fact that besides the roughing of the plane surfaces, finishing as well as smoothing and lapping the edges must also be carried out, the number of necessary setting up operations is inconveniently high. Consequently the idle times constitute a high proportion of the total production time and furthermore, grave problems in respect to handling and storage arise.

Each new loading is a new source of error in respect to the geometrical trueness and dimensional accuracy of the product. Even if accurately made clamping fixtures of adequate design are used for positioning the work-piece, inaccurate clamping may easily result. A small chip, almost invisible, between the bearing surfaces, or an unevenness on the surfaces caused by a blow, results in the misalignment of the work-piece in the fixture. In this case the edges and surfaces of the finished work-piece will not be true, resulting in a product of poor quality.

The object of the invention is to provide a machine for the machining of work-pieces such, as metal cutting tools, for example, by means of which both the edge and face geometry of the product may be held within the prescribed tolerance limits, the down or idle times may be reduced to a minimum as compared to those of other manufacturing processes and the handling and storage, which have in the past caused serious problems, may possibly be fully eliminated.

The invention provides apparatus comprising a mounting for a work-piece and a machining unit carrying first and second cutting members, means being provided to cause relative movement between a work-piece in said mounting and said machining unit so as to bring said work-piece sequentially into adjacency with said first and second cutting members without removal of the work-piece from its mounting, and each cutting member being adjustable so as to be capable of being set with respect to the axes of an imaginary three-dimensional co-ordinate system the centre of which coincides with a predetermined point on a work-piece during machining of the latter by such member.

A major group of work-pieces of the kind with which the invention is concerned comprises lathe tools with or without carbide tips. Since the other single-point tools such as planers, shaper and slotter tools, milling cutter blades etc., do not differ substantially from the lathe tools in respect to cutting geometry and, moreover, as the latter group is preponderant, certain embodiments of the invention which will be described more particularly hereinafter are particularly adapted for the manufacture of lathe tools.

Such exemplary embodiments of the invention will now be described with reference to the accompanying drawings, in which.

Figure 2:
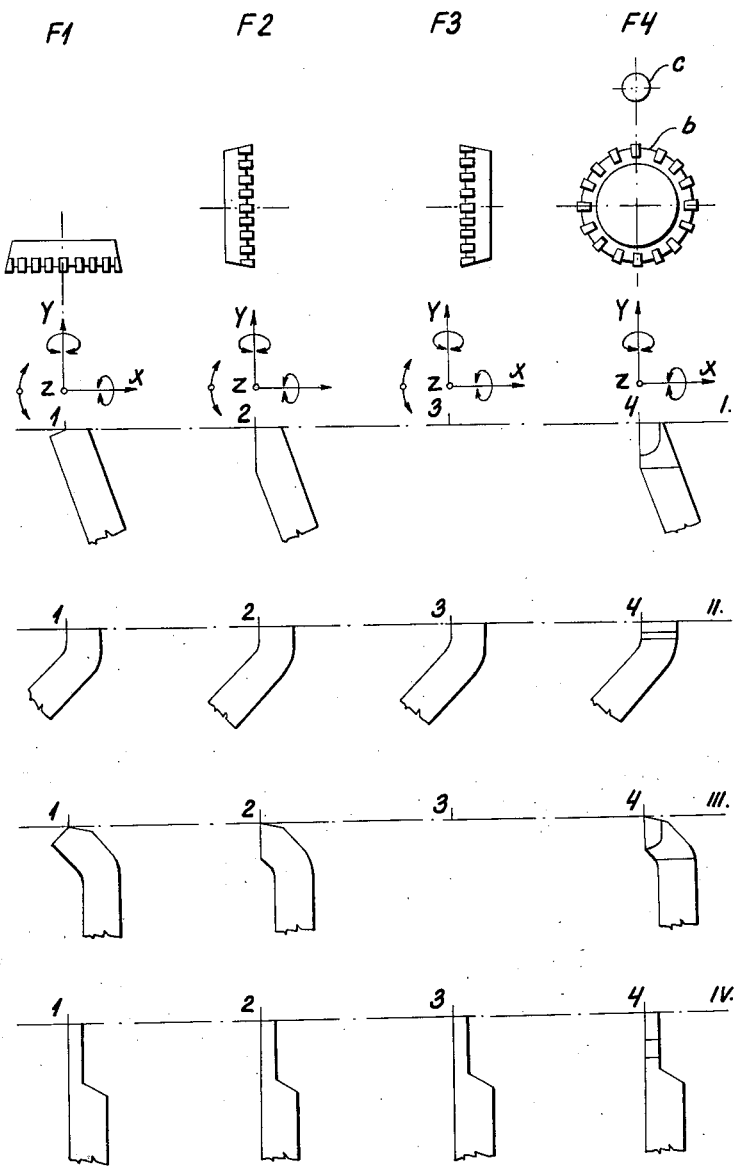
FIGURE 2 is a tooling chart for the four major types of lathe tool.
Figure 3:
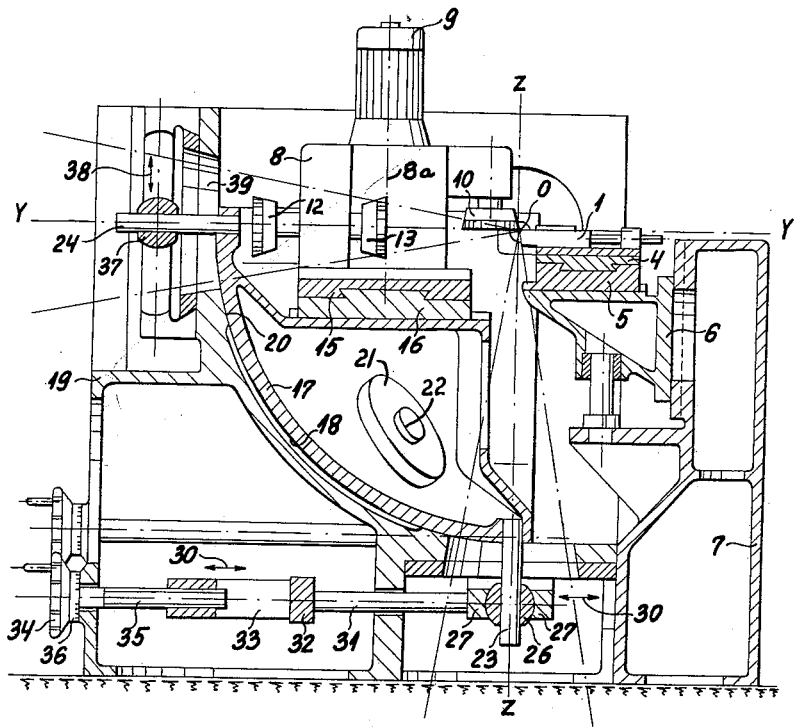
FIGURE 3 is a vertical cross-section through an embodiment of the invention in the form of a machine suitable for mass production.
Figure 5:
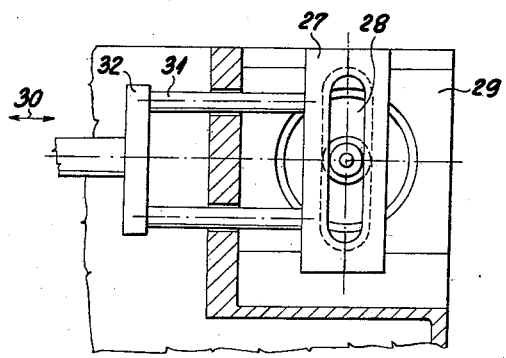
FIGURE 5 is a view of the setting mechanism of the machine.
Figure 4:
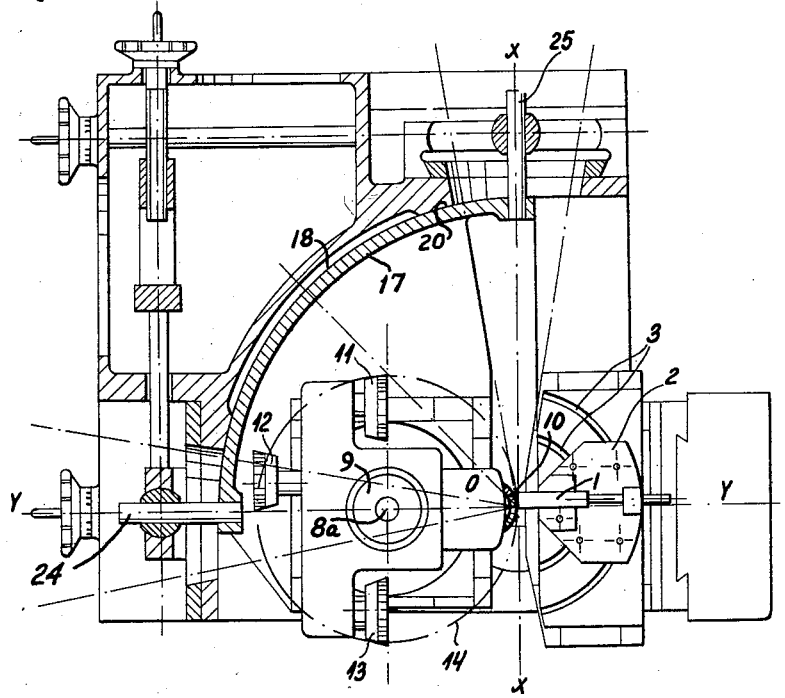
FIGURE 4 is a plan view of said embodiment.
Figure 6:
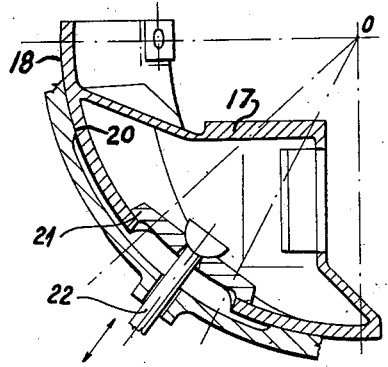
FIGURE 6 shows the clamping mechanism of said machine.

In apparatus according to the invention, a work-piece clamped in a mounting remains in it until all the operations figuring in the tooling chart in FIGURE 2, for example, have been performed by the cutting members.

There are various planes as well as edges in different angular relation to each other which must be machined on the work-piece while its clamped position remains unaltered; thus, the machining units and their cutting members must be positioned or moved so that the surfaces are machined in conformity to the prescribed planes.

The work-piece may be so mounted as to allow the assemblage of a machining line from available machining units or by the employment of only a few single-purpose machines.

From an analysis of the geometry of faces and edges in lathe tools and the manufacturing process thereof it may be seen that there exists a regular relation between them which, properly used, helps in finding the right position for the work-piece.

The location procedure for a straight shank lathe tool will now be described.

From the machining point of view the point of intersection of the face and the two backs is a characteristic central point of the tool. Such a characteristic point exists on every type of lathe tool. Thus, when carrying out the separate operations, the position of this point relative to the cutting member of the machining unit must be determined for each operation. This provides one of the bases for the location of the tool in the course of machining. From the practical point of view the best method is to provide a straight or curved path for this characteristic point during the process.

Figure 1:
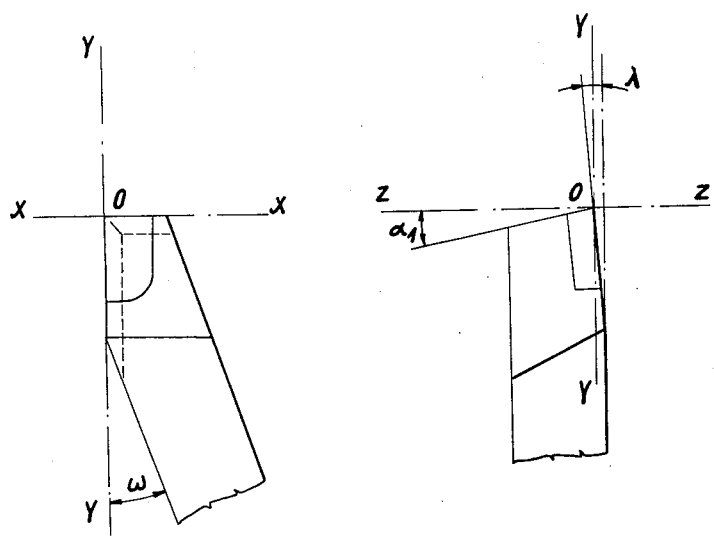
FIGURE 1 is a sketch showing the edge and face geometry of a straight shank lathe tool (Standard ISO TC 29/201, No. 1)
Figure 1:
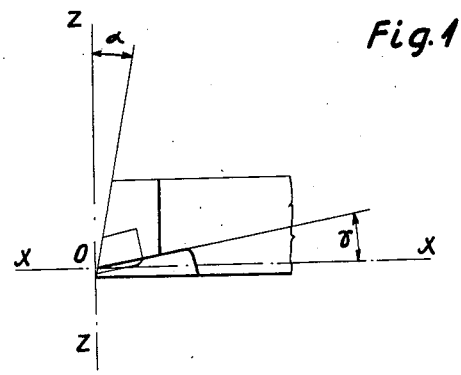

As a second step of the location procedure, one of the tool surfaces must be fixed relatively to the said characteristic point, or to its path. It is sufficient to lock one surface in position, because the planes and edges have a fixed position relative to each other. Thus, with the straight shank tool (see FIG. 1) given as an example, the characteristic point is assumed to be the point O of the X, Y, Z imaginary coordinate system, then the angle between the plane Y—Z and the back of the end cutting edge is the back angle $a$, the angle between the plane X—Y and the face, measured at right angles to the end cutting edge is the rake angle Y, the angle between the plane X—Y and the face measured parallel to the main cutting edge is the cutting edge inclination λ and the angle between the plane X—Z and the back of the side cutting edge is the relief angle of the side cutting edge $a_1$; these are the angles which determine the angular relation of plane surfaces to each other. For a complete determination of the positions of the plane surfaces relative to each other, it would be necessary to know the distance between the planes as well as the thickness of the tool but this aspect has no importance and will now be disregarded.

One of the edges running towards the characteristic point of the tool must be positioned so as to coincide with the path of this characteristic point, for example, along the axis Y of the imaginary coordinate system.

After this has been done, the work-piece retains only one degree of freedom; namely, it can rotate about the axis X. This possibility to rotate must be prevented by forcing the surface of the tool shank opposite the edge coincident with the axis X against the locating surface in the mounting. The aforementioned surface of the tool shank is parallel to the axis Y of the imaginary space co-ordinate system on the majority of lathe tools.

With regard to the clamping of the tool, the setting angle ω between the tool shank side perpendicular to the aforementioned face and the axis Y of the imaginary co-ordinate system is also important, and can be easily determined on the basis of the foregoing from the geometrical shape of the tool head and tool shank.

Having performed the location and adjustment of the work-piece, setting the machining units and cutting members is a relatively simple procedure. The planes where cutting action takes place must be parallel to those on the tool head. Furthermore, since setting the individual cutting members (where the work-piece mounting is fixed) is effected with respect to the same co-ordinate system X, Y, Z, used as a basis in the location of the work-piece, and taking into account that the characteristic point of the tool and one of its edges lie always in the axis X, for example, then setting the cutting tools may be accurately performed without difficulty by adequately rotating the planes where cutting action takes place around the axes X, Y or Z, for example. In practice, setting the cutting tools of the machining units may be greatly simplified by using a finished tool clamped in the feeding device as a template for setting.

FIGS. 3 to 6 show an embodiment of the invention in the form of a machine suitable for performing several operations. The work-piece must be clamped on the machine—according to the basic feature of this invention—so as to coincide with the point O of the imaginary coordinate axes X, Y, Z and the cutting tools of the machine must be moved so that they form the planes on the work-piece at the desired angular positions. As may be seen from the vertical cross-sectional view in FIGURE 3 the work-piece 1 may be rotated around the O-point of the imaginary coordinate system along a circular path and is mounted on the clamping plate 2 in FIG. 4. By swivelling said clamping plate 2, the setting angle ω of the work-piece can be quickly adjusted. Said clamping plate is locked in position by screws extending into slots 3.

In order to set the corresponding point on the work-piece 1 to coincide with the O-point of the imaginary coordinate system X, Y, Z, said clamping plate 2 is mounted on a saddle assembly formed by two slides 4 and 5 traversing perpendicularly to each other; by traversing these slides the work-piece 1 may be set to any chosen position on the horizontal plane. The dual saddle assembly is mounted on a column member 6 sliding in the vertical direction along guides of the frame 7 fixed to the ground. Vertically, the said column member is traversed by a screw-type or other mechanism operating on a known principle.

The cutting members for carrying out the machining operations on the surfaces of the work-piece 1 are mounted on the machining head 8, which is rotatable about a vertical axis 8a. Within the housing of said machining head 8 there is a driving mechanism operated by an electric motor 9 for providing feeding motion to the tools. The machining head of the embodiment shown in FIGURE 3 accommodates four tools 10, 11, 12 and 13, which are clamped so that the outer end of said tools coincides with the point of intersection of the coordinate system X, Y, Z when rotating the machine head 8; thus said ends are positioned on a circle 14 around the axis of rotation of said machining head 8. When in operation, the outer end of said tools 10 to 13 first comes into contact with the work-piece 1. The necessary feeding motion is provided by the straight traversing movement of said machining head 8 and to achieve this, the machining head 8 is mounted on a dual saddle assembly comprising two slides 15 and 16 travelling perpendicularly to each other.

Clamping the work-piece 1 in the desired location, setting the cutting members and feeding the latter along a straight path during the machining operation is not sufficient to ensure the machining of all the desired plane surfaces of the work-piece. To do this, it is necessary to set the cutting members to a desired angular position. Since said work-piece 1 is positoned in relation to said imaginary X, Y, Z coordinates to allow the point of intersection of three convergent plane surfaces on the work-piece to coincide with the O-point of said coordinate system, and one edge of said work-piece is aligned with one of the axes of said coordinate system, and the angles of surfaces to be machined in relation to the other planes are determined by turning said work-piece around said imaginary axis, means must be provided for setting either said machining head 8 or the machining planes of said cutting members 10 to 13, which means allow said machining head to be rotated (with the cutting members clamped therein) around the axes of said imaginary co-ordinate system X, Y, Z so as to permit said machining tool, whilst touching said work-piece, to retain its point of contact, that is, to remain in the O-point of said coordinate system X, Y, Z during rotation.

To this end, the machining head 8 and its saddle assembly 15 and 16 are mounted on a supporting member 17 having a spherical outer surface. Said outer spherical surface 18 of said supporting member 17 bears against the inner spherical surface of a supporting element 20 on the machine frame 19. Said spherical surface 18 and said supporting element 20 are in contact only over a limited area of their bearing surfaces which is, however, sufficiently large to take the pressure due to the weight and forces arising during machining.

Different means to reduce the weight load, such as an air cushion for example, may be used to facilitate movement while setting. The spherical surface 18 and the mating surface of its counterpart 20 may be made of other known non-metallic materials, such as epoxy resin for example, to reduce machining costs during manufacture.

The spherical surface 18 may be traversed in any direction on the surface of the supporting element 20. Locking of the supporting member 17 after setting is done by means of a pressure plate 21 and a screw having a spherical head 22 fitting into the central orifice in said plate (see FIGURE 6).

Since the spherical surface 18 bears against a stationary surface of similar curvature and may be moved thereon, the points of said cutting tools located in the O-point of said coordinate system X, Y, Z do not alter their position during the movement of the surface 18 or of the machine head 8, respectively.

Rotation of the machine head 8 as well as of cutting tools 10 to 13 about the coordinate axes X, Y, Z is performed by means of an actuating mechanism connected to the spherical surface 18 and to the spherical shell 20 respectively. From said spherical shell 18 three pins 23–25 project at right angles to each other. In the normal position of the supporting member 17, the pin 23 is parallel to the Z axis of the imaginary coordinate system X, Y, Z, pin 24 to the Y axis and pin 25 to the X axis (see FIGURE 4). By means of the pin 23, the spherical shell 18 may be rotated about the axis X. Pin 23 is arranged to be longitudinally traversable within the bore of a ball joint member 26. The member 26 is traversable longitudinally in a slotted frame 27 which may be integral or may consist of two parts and in a slot 28 of the latter respectively. The slotted frame 27 may be moved in the direction indicated by the arrow 30 (FIG. 5), on a slide 29, by means of mechanism comprising tie rods 31, a yoke 32, a sleeve 33 clamped to said yoke and a screw spindle 35 attached to said sleeve by threads and having a wheel 34 on its end. The wheel 34 may be rotated together with the spindle 35, without traversing the latter longitudinally. The amount of travel of the ball joint member 26 is indicated on a vernier dial 36 connected to the wheel 34.

Rotating the wheel will cause the sleeve 33, the tie rods 31 and the slotted frame 27 to move in the direction of the centre line of said spindle 35. The ball joint member 26 and the pin 23 are entrained by said slotted frame so that, during movement, the ball joint member 26 revolves in the slotted frame 27 while the pin 23 moves inwards or outwards within the bore of the ball joint member. As a result of the rotation of the wheel 34, the spherical surface 18 assumes a new position on the supporting element 20.

Displacement of the spherical surface 18 is not impeded by the pin 24 and its moving gear, since the ball joint member 37 enclosing the pin 24 may move unobstructed in its slotted frame in the direction of the arrow 38. When shifting the spherical surface 18, the third pin 25 remains in its place but rotates about its centre line.

The moving gear for each of the pins 24 and 25 is of a design similar to the moving gear for the pin 23. To ensure free unobstructed movement of each of the three pins, tapered bores 39 are machined in the machine frame 19, the extensions of the sides of the bores 39 up to said O-point of said imaginary coordinate system X, Y, Z including a taper angle which is the double of the maximum unidirectional displacement angle of the spherical surface 18.

By turning each of the pin-moving wheels 34 consecutively the spherical surface 18, together with the cutting tools, may be set to a position anywhere within the limits of setting.

The apparatus described above may be modified in that the number of moving gears necessary to move the spherical surface 18 may be less than three depending upon the kind of machining operation to be performed on the machine. The cutting members may be milling cutters or grinding wheels, of a number higher or lower than 4.

In the case of a machine where the work-pieces are presented one by one to a series of adjacent cutting members, only those cutting members are incorporated in any of said machining units which are required to perform an operation. Such a machine may include only multi-purpose machines of the kind described above, or single-purpose and multi-purpose machines together. The machining units necessary for the operation may be arranged in one row, or the complete series of operations may be done on two rows of machines. This latter arrangement is useful primarily where carbide-tipped lathe tools must be produced. In this case the first row of machines serves for roughing the tool head, then the tips are brazed on and finally finishing follows on the second row to give the desired cutting edge geometry.

When allotting the operations to the individual units of one row, it should be borne in mind that machining times must be approximately equal in each of the said units within one row. That is the only way to ensure maximum exploitation of the machines. Since said work-pieces move on a feeding device a finished tool leaves said row of machines at the end of each cycle time.

When allotting the single operations for the machining units, roughing of a surface may be followed by finishing the same surface; however, the arrangement may be such that finishing follows only after having ended all roughing cuts.

FIGURE 2 shows tooling charts for straight shank (I) (according to standard ISO TC 29/201, No. 1), bent (II) according to standard ISO TC 29/201, No. 2), side (III) (according to standard ISO TC 29/201, No. 6) and recessing (IV) (according to standard ISO TC 29/201, No. 7) lathe tools. The chart shows the directions of axes of said assumed coordinate system X, Y, Z, as well as the directions for settting the cutting members.

At station F4, a cutter head (b) and a shank cutter (c) are shown. This is an example of the case in which the necessary machine time is shorter than that of other machining stations and, therefore, a supplementary operation has to be performed at the same position. Furthermore, it shows simultaneously a manufacturing process, where closed or open tip seats must be machined in the same position according to the types.

Figure 7:
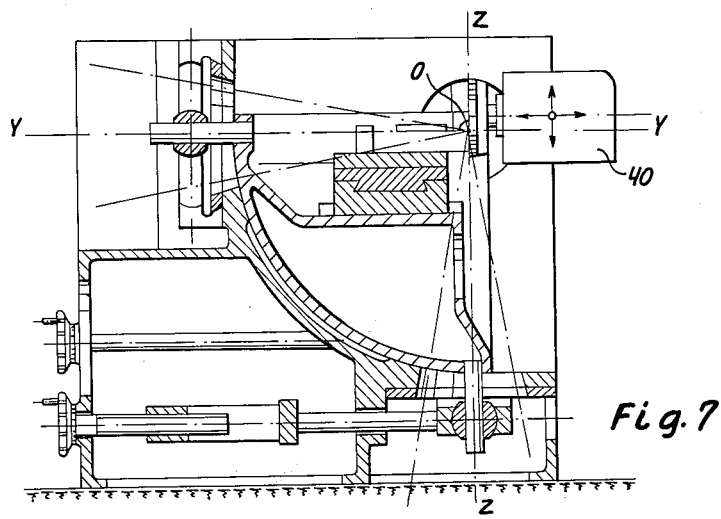
FIGURE 7 is a vertical cross section through another embodiment of the invention in the form of a machine suitable for small series production or for reconditioning worn tools.
Figure 8:
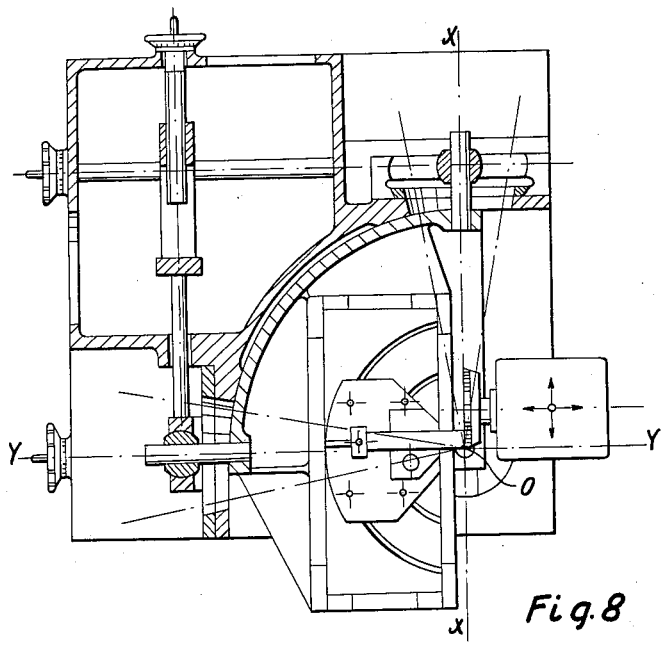
FIGURE 8 is a plan view of the machine of FIGURE 7.

FIGURES 7 and 8 show a characteristic example of a machine tool on which rarely used cutting tools of particular shape may be machined in small lots or a small number of worn cutting tools of any shape may be reconditioned, for example, reground. This latter feature has a particular significance since reconditioning of cutting tools to the original shape and quality may be achieved by means of this equipment with an economy superior to that of all machines hitherto used.

The design of the machine differs from that of the machines shown in FIGURES 3 to 6, inasmuch as the clamping plate 2 occupies the place of the machining head 8, which is replaced by a machining head 40 equipped with cutting members. It is possible, of course, to replace said machining head 40 by the aforementioned machining head 8, which makes the machine more versatile and offers a wider variety in its production range.

This invention is by no means confined to the operational elements and machine designs mentioned above. Thus, for example, instead of the continuous feeding of work-pieces, the fixtures may be mounted on trucks, or means for moving the setting elements described above may be replaced by other means in the form of machine tool equipment hydraulically, pneumatically or electrically operated.

What I claim is:

1. A machine for making a single point tool having three angularly interrelated surfaces intersecting in such single point, said machine comprising, in combination, a locating device for locating and holding a workpiece from which said tool is to be made; first means mounting said locating device for angular adjustment about an axis passing through said single point of said tool; second means mounting said locating device for adjustment longitudinally of each of three mutually perpendicular axes intersecting in said single point, one of said mutually perpendicular axes being identical with the axis about which said locating device is angularly adjustable; a machining unit including at least two tools each having a point of application and each being selectively movable into operative relation with said workpiece, said machining unit being angular adjustable about a fourth axis; the application points of said tools being located on a circle concentric with said fourth axis, and said machining unit being adjustable about three mutually perpendicular axes respectively identical with said first-mentioned mutually perpendicular axes; a relatively fixed bearing for said machine unit having a spherical bearing surface; a support for said machining unit having a spherical bearing surface cooperable with and supported by said first-mentioned spherical bearing surface, the centers of said spherical bearing surfaces being at said single point; clamping means effective to clamp said bearing surfaces in relatively adjusted relation; and slide means supporting said machining unit on said support means and constructed and arranged for adjustment of said machining unit longitudinally of at least two of said first three axes.

2. A machine as claimed in claim 1, wherein means are provided for adjusting the position of said machining unit relatively to said spherical surfaced bearing by movement in any of three mutually perpendicular directions.

3. A machine as claimed in claim 2, wherein said adjusting means comprise at least three pins mounted on said machining unit and extending outwardly through openings in said spherical surfaced bearing surface of said bearing.

4. A machine as claimed in claim 3, wherein said pins are mounted in ball-joint devices exteriorly of said spherical surfaced bearing, such ball joint members being mounted in elongated slots in frames extending at right angles to the direction of movement of said pins during adjustment of the machining unit.

5. A machine as claimed in claim 4, wherein movement of said pins is carried out by adjustment of said frames in directions at right angles to the direction of elongation of the slots in the latter.

6. A machine as claimed in claim 4, wherein said frames are provided with screw-threaded adjustment means moving in threaded sleeves and operable from the exterior of the machine.

References Cited in the file of this patent

UNITED STATES PATENTS

| | | |
|---|---|---|
| 968,052 | Hanson | Aug. 23, 1910 |
| 2,161,269 | Zimmermann | June 6, 1945 |
| 2,390,254 | Henkle | Dec. 4, 1945 |